United States Patent [19]

Bolus et al.

[11] 4,431,868

[45] Feb. 14, 1984

[54] SOLID STATE TELEPHONE LINE INTERFACE CIRCUIT WITH RINGING CAPABILITY

[75] Inventors: Daniel M. Bolus, Shelton; Ramon C. W. Chea, Jr., Monroe, both of Conn.

[73] Assignee: International Telephone and Telegraph Corporation, New York, N.Y.

[21] Appl. No.: 281,545

[22] Filed: Jul. 9, 1981

[51] Int. Cl.³ .................. H04M 3/02; H04M 19/02
[52] U.S. Cl. ............................ 179/18 FA; 179/84 A
[58] Field of Search .......... 179/18 HB, 18 PA, 84 R, 179/84 A, 51 AA

[56] References Cited

U.S. PATENT DOCUMENTS 4,220,826 9/1980 Kiss ............................. 179/51 AA
4,349,703 9/1982 Chea, Jr. ...................... 179/18 HB

OTHER PUBLICATIONS

"Applications for Programmable Ringing Generators," D. J. Becker, International Telephone Energy Conference, Wash., D.C., 1978, Conf. Rec., pp. 292-298.

"A Versatile Integrated Electronic Line Circuit", R. Sirsi et al., National Telecommunication Conference, Houston, Tex., 1980, Conf. Rec., pp. 56.2.1-56.2.5.

Primary Examiner—Thomas W. Brown
Attorney, Agent, or Firm—John T. O'Halloran; Jeffrey P. Morris

[57] ABSTRACT

A telephone line circuit including a high voltage amplifier feeds the tip and ring lines at its output. This amplifier is fed by a programmable voltage source which includes a d.c./d.c. converter and means to control the amplitude and polarity of this voltage. All the required electrical signals including d.c. feeding, speech, unsymmetrical ringing and metering pulses are provided through the high voltage amplifier. No high voltage AC switches (relay contacts) are required since the ring signal is provided through the same device (output amplifier) as the speech and d.c. signals. Means are included for minimizing the internal power dissipation by controlling the amplitude of the d.c./d.c. converter voltage. Thus d.c. offset control is achieved by slaving the d.c./d.c. converter voltage to the amplifier output voltage. Three functional blocks form the line interface circuit according to the invention, these being a high voltage circuit including the aforementioned amplifier, a programmable signal generator which includes the d.c./d.c. converter and electronic solid state switching under control of a line feed and supervision circuit which constitutes the third block.

7 Claims, 8 Drawing Figures

1-SPEECH

2-SPEECH + METERING

3-UNBALANCED RINGING

4-BALANCED RINGING

SOLID STATE TELEPHONE LINE INTERFACE CIRCUIT WITH RINGING CAPABILITY

BACKGROUND OF THE INVENTION

1. Field of the Invention

The invention relates generally to telephone central equipment and more particularly to a line interface circuit between telephonic signal originating lines and output tip and ring lines.

2. Description of the Prior Art

The telephone system art has advanced steadily from the earliest days of local multi-party arrangements employing local "talking battery" and ringing magneto. The advent of early manual central switchboards in which subscriber lines and trunk circuits were connected to jacks on a panel receiving plug and cable connections brought about the terms, tip, ring and sleeve. The tip and ring corresponded to the subscriber transmission leads or conductors, i.e. the two wire telephone line. Although the terminology is archaic in terms of present day solid state automatic telephone systems, the terms tip and ring are still used to identify the two conductors of a two wire telephone line.

In relatively modern prior art telephone central equipment, the ringing function is usually implemented by switching the two subscriber lines to a common ringing signal source which is a high voltage (high at least in telephone system terms, i.e. up to 120 volts RMS). The switching of this signal onto the tip and ring lines is conventionally accomplished by means of relays. Those relays essentially isolate the speech and other signals from the line while the ringing voltage is connected and vice versa. The advent of solid state telephone system switching has made possible the compact, reliable and relatively inexpensive implementation of telephone central main frame switching without the great banks of stepping relays and other electromechanical devices. More gradually, improvements are being made in subscriber line/trunk interface circuitry. U.S. Pat. No. 4,161,633 entitled "Subscriber Line/Trunk Circuit" describes certain of these improvements. In particular, a microprocessor controlled interface circuit placed between analog telephone lines and trunks and a digital switching system is disclosed. All processing of incoming analog systems is accomplished by a line circuit including measuring, monitoring, testing functions and the speech path. That reference further shows the generation of a d.c. signal powering the handset microphone as well as ringing and other tones. Certain subsystems in an overall system according to the invention are also shown in U.S. Pat. No. 4,161,633, a form of the so-called programmable signal generator being one of these.

The manner in which the present invention advances the state of this art will be understood as this description proceeds.

SUMMARY OF THE INVENTION

It may be said to have been one particular objective of the invention to eliminate the high voltage AC switches (relay contacts) usually associated with application of the ringing signal. This is accomplished through use of a low voltage ringing signal reference (source), which is solid state switched into a high voltage solid state amplifier. This amplifier is actually two operational amplifiers, one for each of the tip and ring conductors. Speech and d.c. signals are also provided through these same operational amplifiers as well as metering and other signals.

The so-called line interface circuit according to the invention comprises three subassemblies, namely the high voltage amplifier and it components, a programmable signal generator (PSG) and a line-feed, ringing supervision circuit (LFS). The ringing signal is independently generated and applied in each subscriber pair of lines, thus the ringing signal is independently generated for each subscriber line.

A d.c./d.c. converter provides isolation from the d.c. (battery) source and the amplitude of this d.c. supply for the amplifiers aforementioned is controlled to provide a minimum d.c. offset guaranteeing linear amplificaion (especially of speech signals), but also the d.c. converter voltage is minimized to control power dissipation in the high voltage amplifier circuits and some other components of the line interface circuit during ringing.

The details of the circuits unique to the combination of the invention will be described in detail as this specification proceeds.

DETAILED DESCRIPTION

Figure 1:
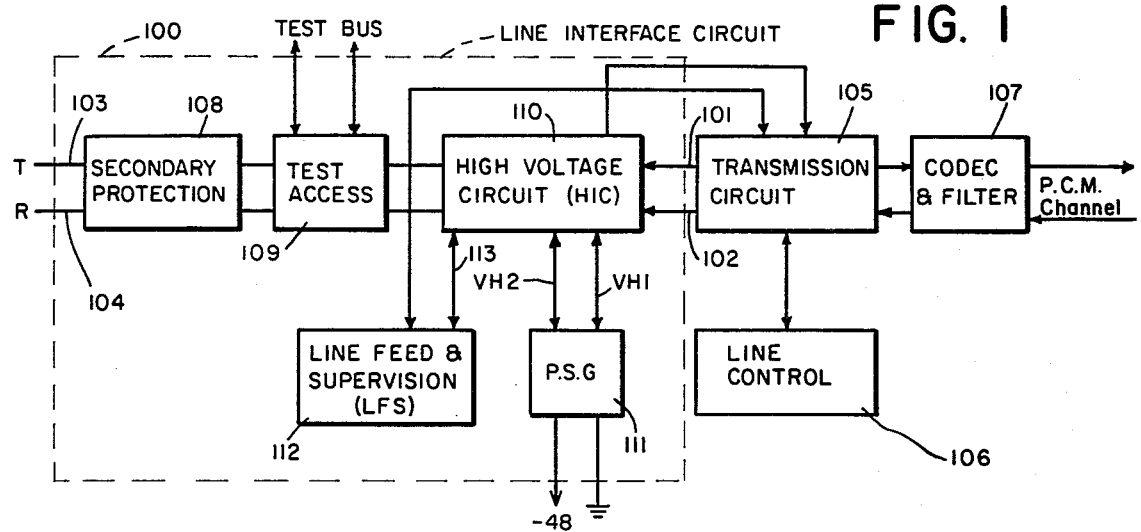
FIG. 1 is a block diagram showing the component subassemblies of the line interface circuit according to the invention and their relationship to certain other transmission and pulse code modulation circuits.

Referring now to FIG. 1, the line interface circuit, which is the most significant aspect of the combination of the invention, is shown within the dashed-line box 100. This circuitry is basically a two wire input/four wire output configuration, lines 101 and 102 being those received from a transmission integrated circuit 105 which is a cooperating part of the present combination, but is known per se in the art. Much the same may be said of line control circuit 106 and codec block 107 inputting from and outputting to a pulse code modulation channel for example. Some background information in respect to blocks 105, 106 and 107, including the two/four wire conversion accomplished in 105 may be obtained from the aforementioned U.S. Pat. No. 4,161,633 and elsewhere in the technical literature. The tip and ring lines 103 and 104, respectively, may be thought of as connecting to a subscriber's individual telephone line and the secondary protection 108 and test access block 109 are to be understood to be entirely conventional in this art.

The high voltage integrated circuit amplifying means of block 110 accomplishes the integration of speech, metering, ringing, and d.c. feed characteristics in a novel arrangement in which two d.c. energizing leads VH1 and VH2 are uniquely controlled by a programmable signal generator 111. Line feed ringing supervision in a more or less conventional circuit 112 provides a low-level ringing reference signal on 113, the application of which is controlled by the programmable signal generator 111 in a manner which will be described more explicitly as this specification proceeds.

Figure 2:
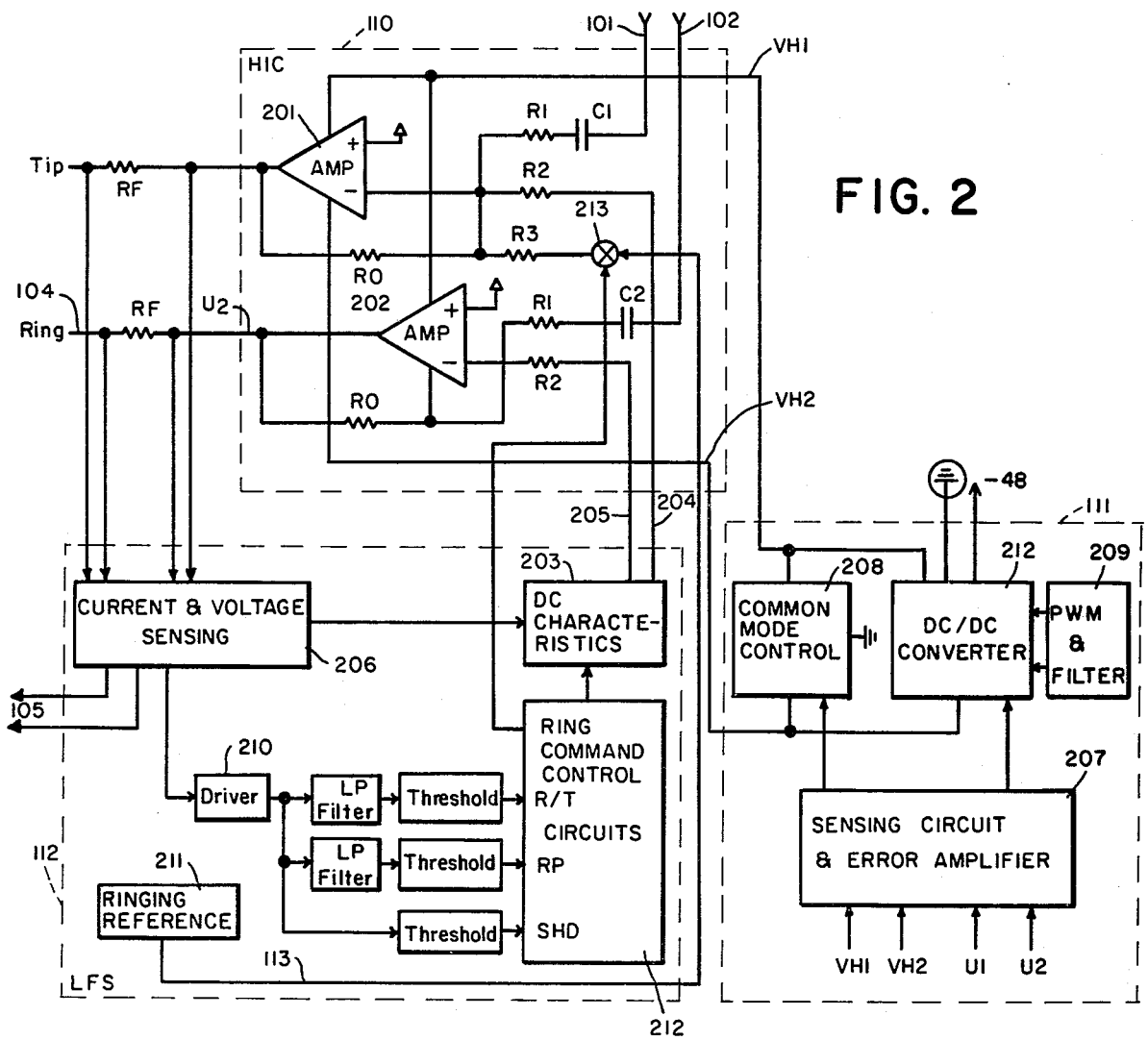
FIG. 2 is a more detailed showing of the elements included in the line interface circuit of FIG. 1.
Figure 3:
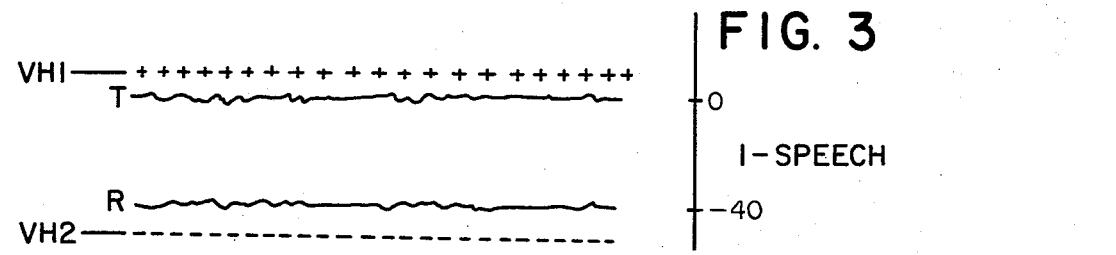
FIG. 3 illustrates speech and d.c. signals on tip and ring wires and programmed signal generator output signals.

Referring now to FIG. 2 taken in conjunction with FIGS. 3, 4, 5 and 6, the basic principles of the invention and typical instrumentation will be described. It will be noted that lines 101 and 102 are represented as inputs from block 105 of FIG. 1 and lines 103 and 104 correspond to the same lines identified on FIG. 1. The so-called high voltage integrated circuit is identified within the dashed line enclosure on FIG. 2. A pair of operational amplifiers 201 and 202 are of conventional type constructed in accordance with solid state techniques. The output of amplifier 201 is connected to the speech, d.c. characteristic and ring signals, respectively, through R1, R2 and R3. All of these input signals are low level and the values of these resistors considered with feedback resistor $R_o$ are calculated to provide the required output amplitudes. Input lines 101 and 102 are fed through capacitors C1 and C2 so that d.c. levels applied to amplifiers 201 and 202 are not a function of d.c. levels extant at 101 and 102, but rather are determined entirely within the (LFS) circuitry. These d.c. level considerations include placement of the tip line d.c. level near 0 (ground) as indicated in FIG. 3 and the ring line at a negative voltage, depending both on the line termination and on the required d.c. characteristics. It is also possible for tip and ring d.c. polarities to be reversed vis-a-vis those shown on FIG. 3. That function being effected by means of a conventional circuit (flip-flop or the like) 203 which sets its output potentials on 204 and 205 to effect either the relationships of FIG. 3 or those of FIG. 4 with tip and ring lines interchanged.

It will be noted that the amplifier energizing potentials VH1 and VH2 in respect to the d.c. levels of the tip and ring lines of FIG. 3 have a constant offset sufficient to ensure linearity of speech amplification of the signals passing through C1 and C2 and arriving in amplified form at 103 and 104, respectively.

Figure 4:
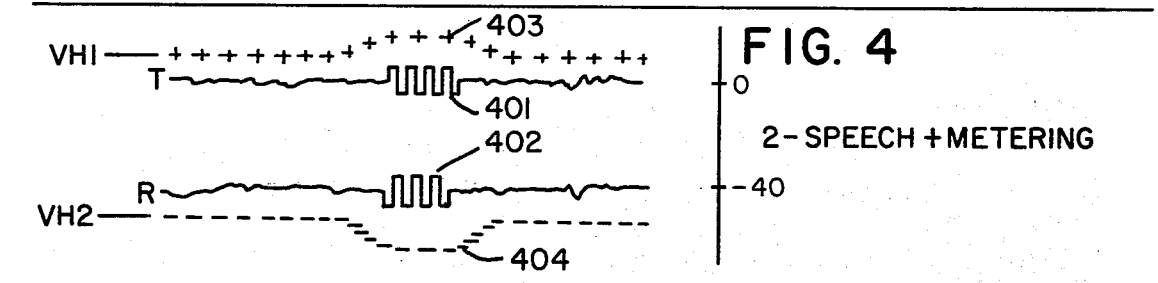
FIG. 4 illustrates the superimposition of metering signals on the d.c. levels in the presence of speech signals.

Considering now FIG. 4, a train of metering pulses 401 on the tip line and 402 on the ring line is superimposed on the d.c. level and speech modulation. To avoid clipping effects due to the instantaneous values of the metering pulses 401 and 402 "punching through" VH1 and VH2 levels, bulges 403 and 404 are inserted as indicated on FIGS. 5 and 6 where the much larger ringing signal values are extant at the outputs 103 and 104. These metering pulse amplifier energizing signal "bulges" will be further discussed hereinafter.

Concerning the control of the d.c. characteristics, it will be noted that current and voltage sensing circuits 206 respond to the aforementioned signals $u_1$ and $u_2$ and also to the voltage drop across the resistors $R_f$ in each of the tip and ring lines 103 and 104, respectively. Thus, tip and ring line current values are derived on an instantaneous basis as a function of the voltage drops across these resistors $R_f$.

Figure 5:
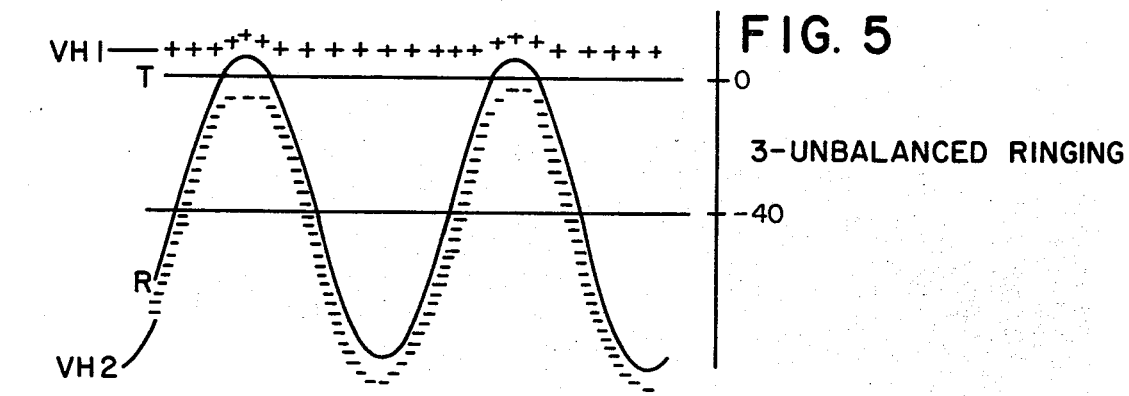
FIG. 5 illustrates the ringing and d.c. waveforms on tip and ring wires and the corresponding programmed signal generator output signals.
Figure 6:
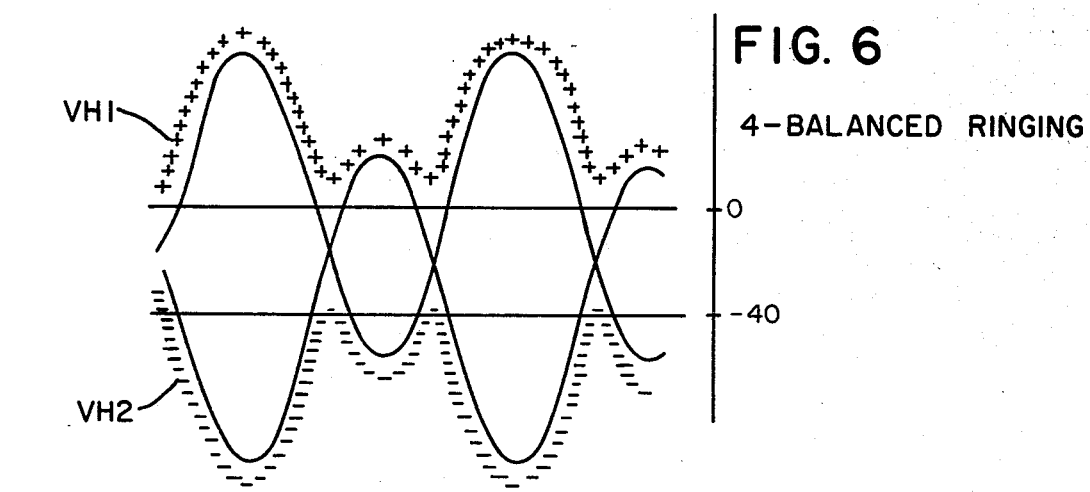
FIG. 6 depicts balanced ringing waveforms for tip wire and ring wires and programmed signal generator output voltages, (with offsets) during ringing.

Referring now to FIGS. 5 and 6, it will be seen that the two energizing voltage leads VH1 and VH2 which provide power for the amplifiers 201 and 202 are specifically controlled by the programmable signal generator 111. The signals $u_1$ and $u_2$ have a substantially constant d.c. component as illustrated in FIG. 3 and in FIG. 4 except for the "bulges" 403 and 404. However the much larger ring signal amplitude would require that the amplifiers 201 and 202 and other parts of the associated circuitry dissipate excessive amounts of power if VH1 and VH2 were held constant at sufficiently high values to avoid clipping of the ringing signal.

In accordance with the invention, a salient feature thereof is a slaving provision of tracking of the instantaneous amplitudes of the signals $u_1$ and $u_2$ for the generation of variable $VH_1$ and $VH_2$ values following the instantaneous ring signal value plus an offset so that the amplifier dissipation and that of other associated components is limited. The offset may be thought as a circuit bias introduced conventionally as part of a voltage regulating loop.

The $u_1$, $u_2$, VH1 and VH2 signals are applied to a sensing and error amplifier 207, including a offset control circuit. This facilitates the control of a pulse-width modulator 209 in accordance with a required value of VH1 and VH2 (including the offset). Programmable signal generator 111 may be thought of as a floating (isolated) controllable voltage regulator in basic terms. It is represented on FIG. 8 as a switching type regulator, however, a number of other conventional circuit arrangements are available therefor.

Other d.c. functions such as the reversing of the tip 103 and ring 104 lines d.c. levels provided in accordance with a current related signal from 206 through a driver 210. Low-pass filters and multiple threshold circuits for recognizing subscriber line changes such as switch between ringing and speech modes for appropriate d.c. driver signal adjustment.

The ringing signal or reference generated at low level in block 211 is passed by switch 213 responsive to a ring command from block 212. This ring command is one of the signals generated through driver 210 and the intervening filters and thresholds circuits providing information to block 212 as to the condition of the subscriber line (i.e. susceptible to ringing or operating in the speech mode).

Figure 7:
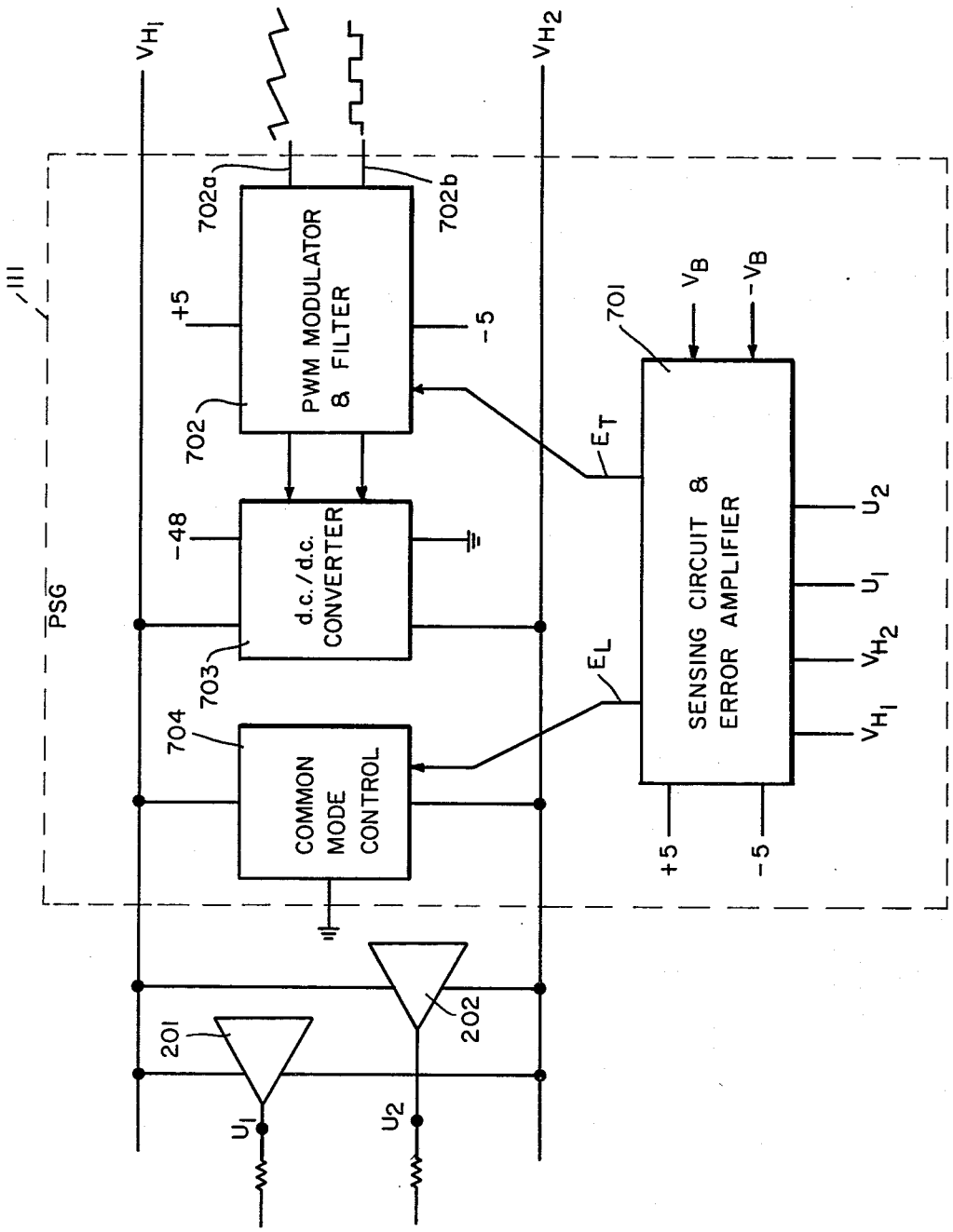
FIG. 7 is a programmed signal generator (PSG) block diagram.

Referring now to FIG. 7, a programmable signal generator for providing the slaved VH1 and VH2 supply voltages is shown as a functional block diagram. A sensing circuit and error amplifier 701 generates two error signals $E_T$ and $E_L$ for controlling the voltages VH1 and VH2 in the first case and the common mode voltage in the other case. The control circuit 701 is a relatively straightforward circuit which will be further discussed in connection with FIG. 8, however, suffice to say at this time that it effects the comparisons between $u_1$ and VH1 and also between $u_2$ and VH2. This error describes the voltage slaving differential or offset on an instantaneous basis. Receiving this signal $E_T$, the pulse width modulator (PWM) and filter 702 deliver two corresponding pulse width modulated signals as a function of the sign and amplitude of the error signal $E_T$. Since this operation of slaving VH1 and VH2 to the instantaneous $u_1$ and $u_2$ voltages is essentially a feedback process, stability can be insured with proper filtering in accordance with standard criteria in that regard. Pulse width modulator 702 receives an external gating signal at 702b and a synchronous, sawtooth signal on its input 702a. A comparator or pickoff within 702 chooses a point as a function of $E_T$ operating to terminate a gate circuit synchronized by the same pulse (clock) as applied to generate the sawtooth and gate signals at 702a and 702b, respectively.

The previously referred to d.c./d.c. converter may be operated as a switching type, voltage regulator energized from the telephone system 48 volt d.c. source. The variable width pulses from 702 become switch gates such that transformer coupling may be employed to provide the necessary floating voltages VH1 and VH2. Synchronous rectification controlled by the 702 pulse output may be effected.

The block 704 serves to adjust the common mode voltage, i.e. VH1 and VH2 with respect to ground. For this purpose, a common mode error signal $E_L$ is derived from 701 and applied to 704 in a manner which will be further described in connection with FIG. 8.

Figure 8:
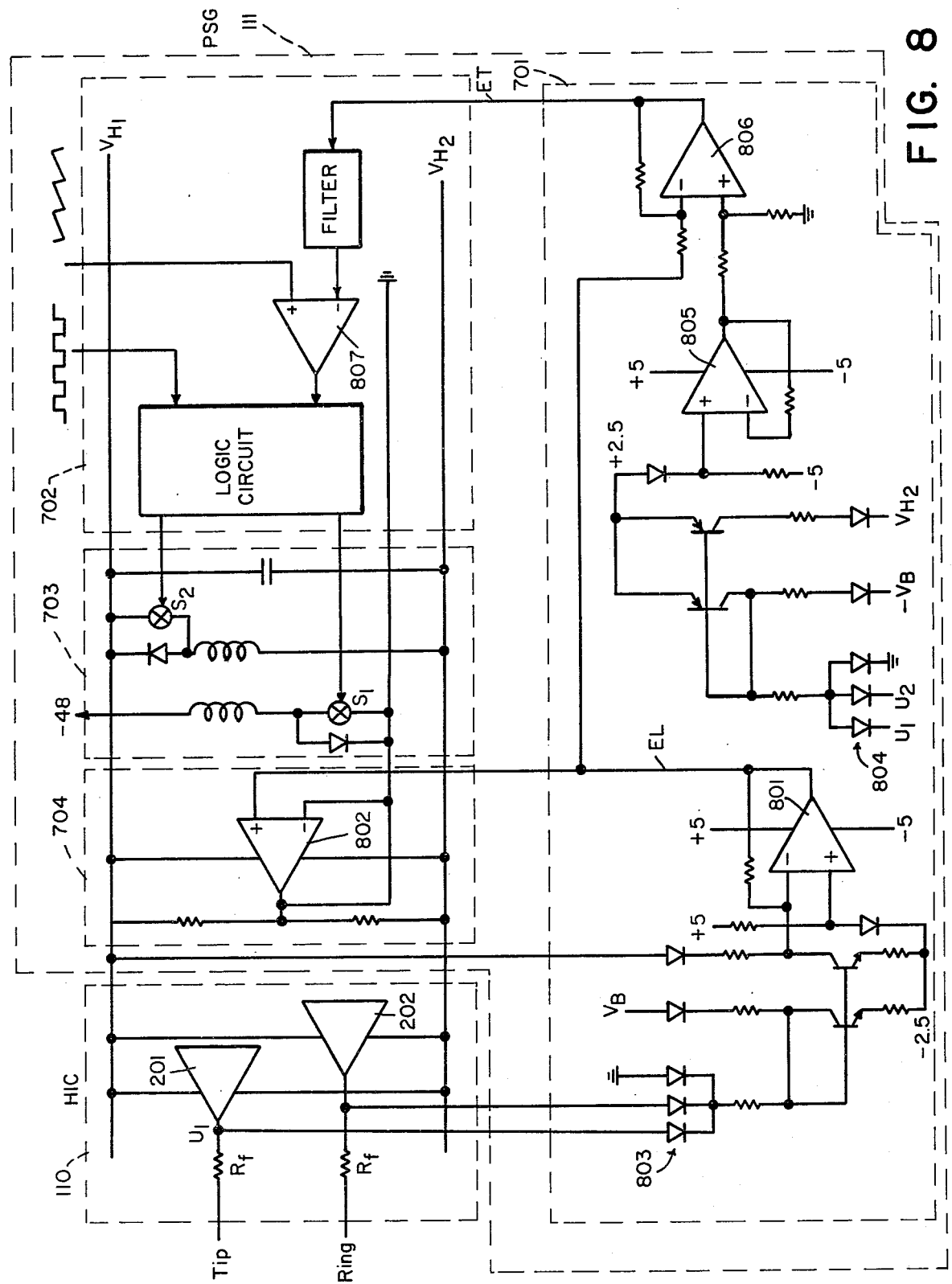
FIG. 8 is a typical solid-state circuit detail for the amplifying means (HIC) and programmable signal generator (PSG).

Referring now to FIG. 8, additional detailed circuitry is shown for the generation of the common mode error signal $E_L$ and the slaving function error signal $E_T$. Three diodes at 803 will be seen to be arranged in a configuration which compares $u_1$ and $u_2$ to ground and applies this signal through intervening amplifiers to the operational amplifier 801 whose output is the error signal $E_L$. Operational amplifier 802 within the programmed signal generator block 111 effectively locates a ground between VH1 and VH2 for common mode control of the voltage control of the tip and ring lines. The requirement for this common mode voltage control is well understood in the telephone art and is not further described herein.

A group of three diodes in 804 similarly compares $u_1$ and $u_2$ with VH2 feeding amplifiers 805 and 806 to generate the slaving error $E_T$ application through a filter and an additional amplifier 807 activates the switching type regulator which as previously indicated produces the slaved relationship among VH1, VH2, $u_1$ and $u_2$ as described in connection with FIG. 3 and especially FIGS. 5 and 6.

The so-called metering pulses which may be present in the data received at lines 101 and 102 (FIG. 2) may be bracketed by an externally supplied gate signal $V_B$ and $-V_B$ within the line feed supervision block 112 of FIG. 1. This provides the bulges in VH1 and VH2 illustrated in FIG. 4 and previously described. Because of the higher frequency nature of the metering pulses, the slaving circuits herein described could not be expected to follow in the same manner as they follow the ringing signal. Basically, the slaving circuit loop does not have the bandwidth sufficient to provide the instantaneous offset (bulge) at 403 and 404 on FIG. 4, however, a bracketing pulse pair ($V_B$ and $-V_B$) can be externally supplied as above described for the purpose.

From the foregoing description, it will be realized that the objectives hereinbefore mentioned have been fulfilled. Of course, a number of modifications or variations within the scope of the invention will suggest themselves to those of skill in this art. Accordingly, it is not intended that the drawings or this description should be considered as limiting the scope of illustrative only.

What is claimed is:

1. A telephone line circuit connected between subscriber tip and ring conductors of a two-wire telephone line and a two-wire source of integrated telephone signals, comprising:

a ringing reference source providing a ringing signal at a low amplitude level;

solid state amplifying means selectively responsive to said integrated telephone signals, to variable amplifier energizing signals, and to said ringing signal, said amplifying means being connected to provide drive current to said subscriber tip and ring conductors, and wherein said amplifying means comprises a separate solid-state operational amplifier driving each of said tip and ring subscriber conductors;

a programmable signal generator, including slaving means responsive to the instantaneous signal amplitude at the output of said amplifying means for generating and coupling said variable amplifier energizing signals to said amplifying means, said slaving means generating said energizing signals with a predetermined instantaneous offset voltage with respect to said instantaneous signal amplitude and said ringing signal coupled to said amplifying means to provide relative linearity of amplification;

wherein said integrated telephone signals include first input characteristics corresponding to a ringing command, and in which said telephone line circuit comprises means for electronically switching a ringing signal from said ringing reference to the input of the one of said separate solid-state operational amplifiers corresponding to said subscriber tip conductor during said first input characteristics corresponding to said ringing command.

2. A telephone line circuit according to claim 1 further comprising sensing means responsive to d.c. conditions on said tip and ring conductors for controlling polarity and magnitudes of d.c. levels from said amplifying means in response to sensed d.c. conditions.

3. A telephone line circuit in accordance with claim 1 in which said slaving means produces a first error signal as a function of variation of said offset voltage from a desired value and in which said programmable signal generator includes a switching type d.c./c.c. regulator for continuously varying said amplifying means energizing signals as a function of said first error signal.

4. A telephone line circuit in accordance with claim 2 in which said slaving means produces a first error signal as a function of variation of said offset voltage from a desired value and in which said programmable signal generator includes a switching type d.c./d.c. regulator for continuously varying said amplifying means energizing signals as a function of said first error signal.

5. A telephone line circuit in accordance with claim 3 in which said programmable signal generator includes a pulse width modulator responsive to said first error signal to vary the duty cycle of said switching-type regulator to provide said slaved amplifying means energizing signal as a function of said first error signal.

6. A telephone line circuit according to claim 1 in which said separate solid-state operational amplifiers are differential amplifiers.

7. A telephone line circuit according to claim 3 further comprising means for generating a second error signal as a function of variation of common mode voltage between said amplifying means energizing signals and including a common mode voltage correction circuit responsive to said second error signal for maintaining said common mode voltage at a predetermined value with respect to ground potential.

* * * * *